Oct. 15, 1929.

O. JOHNSON

PIPE WRENCH

Re. 17,456

Original Filed June 8, 1926

INVENTOR

Oscar Johnson.

BEST AVAILABLE COPY

Reissued Oct. 15, 1929

Re. 17,456

UNITED STATES PATENT OFFICE

OSCAR JOHNSON, OF ELMHURST, NEW YORK

PIPE WRENCH

Original No. 1,681,641, dated August 21, 1928, Serial No. 114,387, filed June 8, 1926. Application for reissue filed July 31, 1929. Serial No. 382,414.

This invention relates to improvements in pipe wrenches of the class disclosed in the United States Patent No. 1,104,730, issued to W. J. Hamblin, July 21, 1914; and has for its main object the provision of a tool of this kind which has a positive and instantaneous grip, great freedom of release, and is adapted to be instantaneously reversed without taking it off the pipe.

Another object of the invention is to provide a tool of this nature with a locking notch which will prevent accidental loosening and separation of the wrench from the pipe.

A further object of the present invention is to provide a pipe wrench having a dual locking means whereby the wrench may be revolved in a substantial arc and the chain not be disengaged from the tool or the pipe encircled by said chain.

A still further object of the present invention is to provide a pipe wrench which is capable of rotating the pipe engaged by the pipe gripping element in either direction without the necessity of removing the wrench from its engagement with the pipe.

Another object of the present invention is to provide a pipe wrench having a chain or the like forming the pipe gripping element provided with means adapted to engage a double acting or double functioning locking member whereby the wrench is capable of rotating the pipe engaged thereby in either direction without removal of said wrench from the pipe.

Other objects and novel features of construction will become apparent as the specification proceeds.

In the accompanying drawings, forming a part of this specification, in which the various reference numerals refer to the same parts in each of the views, Figure 1 is a longitudinal sectional view of the tool embodying my idea;

Figure 1:
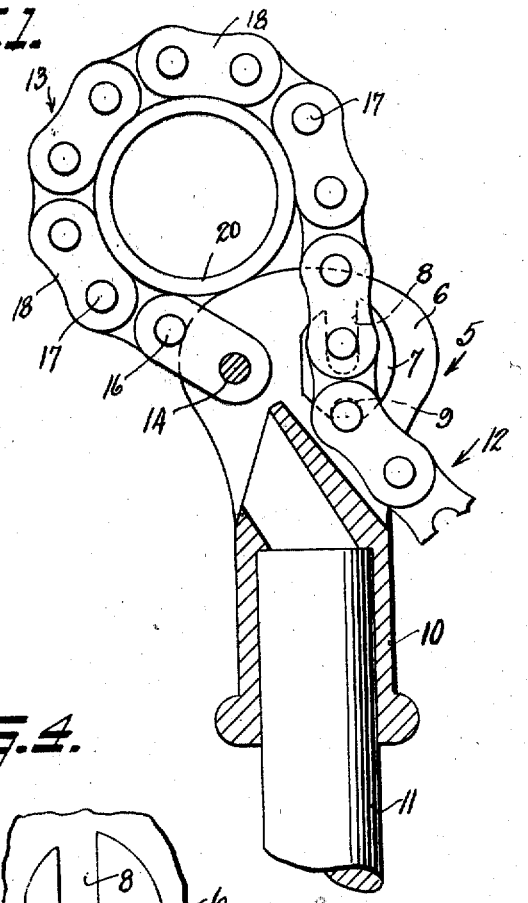
Figure 2:
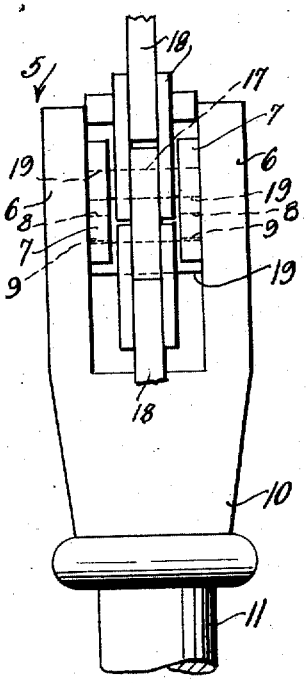
Figure 2 is a view looking from the right of Figure 1.
Figure 4:
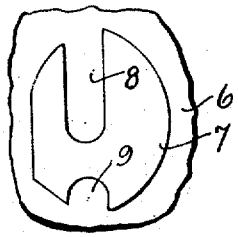
Figure 4 is a fragmental view in detail, showing the locking catch.
Figure 3:
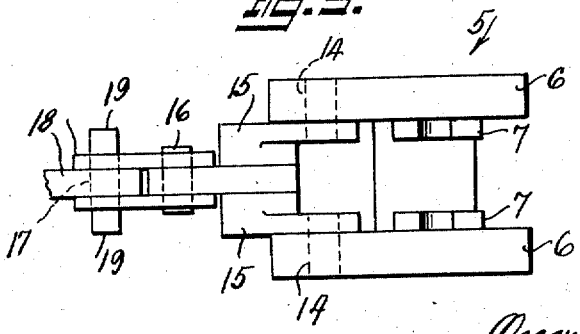
Figure 3 is a top plan view of the tool, looking down upon Figure 1.

Referring to the drawings in detail, 5 indicates a bifurcated head member, having similar lateral walls 6 provided with inwardly projecting combined catch and locking members or projections 7 that are similar in size and shape. The catch members 7 are each provided with an upper vertically extending groove or slot 8 and a lower notch 9. The head terminates at its lower end in a boss or sleeve 10 adapted to receive therein a rod or handle 11. The general contour of the head is such as to allow for ready adjustment of the free end 12 of a chain 13 in the catch members 7 and whereby two smooth face substantially circular cams are formed eccentric to each other on each of the lateral walls 6 on opposite sides of the longitudinal axis of the head as clearly indicated in Figure 1 of the drawings. The highest points of the cams are on the horizontal center line of the head. The chain 13 is pivotally connected to the head 5 by means of pins 14 passing through the walls 6 into link members 15 connected to the chain 13 at 16. Pins 17 connect the links 18 of the chain and project beyond the chain as at 19. The aforesaid arrangement provides oppositely disposed cams to one of which one end of the chain is pivotally connected, the pivotal connection being within the circle of said cam and the other of which provides a catch member for locking the chain about the pipe at a point within the circle of the other cam.

In use, the chain is passed around a pipe 20, as clearly shown in Fig. 1, and the free end of the chain is passed between the walls 6 of the head 5. The extensions 19 of one of the pins 17 are positioned in the slot 8 and the next lower extensions obviously are received in the notch 9. Normally the extensions 19 are loosely positioned in the notches 8 and 9, as clearly illustrated in Fig. 1; in other words the handle 11 is capable of slight movement in either direction before either of the extensions 19 is tightly engaged in the notches 8 or 9 as the case may be. By moving the handle in either direction, that is, clockwise or counterclockwise, it will be apparent that the chain will be tightened against the pipe and the latter firmly gripped thereby. Should the handle be rotated clockwise, it will be obvious that the extensions 19 positioned within the slot 9 will tightly and firmly engage within said slot, and continued clockwise movement of the handle will rotate the pipe in a clockwise motion. Now, should it be desired to rotate the pipe in a counter-clockwise motion to disengage the same, the handle is moved or rotated counter-clockwise, whereupon the extensions 19 in slot 9 will become non-functioning or, in other words, will loosely engage with said slot, and the extensions 19 in slot 8 will be firmly engaged therein, and continued counter-clockwise movement of the handle will rotate the pipe correspondingly. The above-mentioned operations are made possible because of the double locking means formed in the head of the wrench together with the cooperating extensions on the pipe gripping element or chain. By providing the double acting locking means this invention contemplates, therefore, a means for providing a plurality of pivot points on the head of the wrench whereby without removing the wrench from its engagement with the pipe, the latter may be rotated in either direction.

The pipe slides over the upper surface of the head with the chain loose. When, however, the handle has been turned to place the pipe in impinging relation with a cam face, the pipe or other article is slidably and progressively clamped by the chain on the face of the cam.

It is believed that the advantages of this invention will be fully apparent to those skilled in the art to which it appertains in view of the above description and the drawings forming a part of the application, and the particular features of novelty will be pointed out in the appended claims. I desire it understood that the drawings are for illustrative purposes only, and that various changes in the form and proportions of the device may be made within the scope of the appended claims without departing from the spirit of the invention.

Having described my invention, what I claim as new is:

1. A pipe wrench adapted to revolve a pipe in either of two directions without removing the wrench therefrom, comprising a head, a chain secured at one end to said head, pins projecting from said chain, and a catch member on said head provided with an upper locking slot to receive one of said pins when it is desired to revolve the pipe in one direction, and a lower locking slot to receive another of said pins when it is desired to revolve the pipe in the opposite direction.

2. A pipe wrench comprising a head, a handle associated therewith adapted to turn the head when in operation, said head being provided with oppositely arranged smooth substantially circular cams eccentric to each other, the highest points of which are on the horizontal center line of the head, a chain pivotally connected to the said head at one end within the circle of one cam, means on the head at a point within the circle of the other cam for locking the chain about the pipe, one of said cams impinging against the pipe when the head is turned in one direction and the other cam impinging against the pipe when the head is turned in the other direction, thereby tightening the chain about the pipe in either position by the gradual wedging of the cam curve.

3. A pipe wrench comprising a head, a handle associated therewith adapted to turn the head when in operation, said head being provided with oppositely arranged substantially circular cams eccentric to each other, a chain pivotally connected to the said head at one end within the circle of one cam, means on the head at a point within the circle of the other cam for locking the chain about the pipe, the said cams permitting the pipe to be moved from a clamping position on one side of the head to a clamping position on the other side of the head without disconnecting the chain, thereby tightening the chain about the pipe in either position by the gradual wedging of the cam curve.

OSCAR JOHNSON.